Nov. 23, 1954 F. E. JENNER 2,695,048
CHILD'S CAR SEAT
Filed Dec. 2, 1952 2 Sheets-Sheet 1

INVENTOR.
FREDERICK E. JENNER
BY
ATTORNEYS

Nov. 23, 1954 — F. E. JENNER — 2,695,048
CHILD'S CAR SEAT
Filed Dec. 2, 1952 — 2 Sheets-Sheet 2

INVENTOR.
FREDERICK E. JENNER
BY Naylor and Lassagne
ATTORNEYS

United States Patent Office 2,695,048
Patented Nov. 23, 1954

2,695,048
CHILD'S CAR SEAT
Frederick E. Jenner, Sonoma, Calif.
Application December 2, 1952, Serial No. 323,641
3 Claims. (Cl. 155—11)

This invention relates to auxiliary seating equipment for automobiles, and more particularly to a novel form of carrier-type seat adapted to be removably disposed within an automobile so that small children can be transported in such vehicles with optimum safety.

The essential object of the invention is to provide a safe and practical auxiliary car seat for small children embodying novel support means cooperatively relatable with the front and back seats of an automobile for the stable positioning of the seat.

A further object of the invention is to provide an auxiliary car seat according to the object above set forth embodying means adapting the seat for use in cars wherein the distance between the front and back seats is less than the normal distance for four-door cars.

Other objects and advantages of the invention will be apparent from the following description taken in conjunction with the drawings forming part of this specification, and in which.

Figure 1:
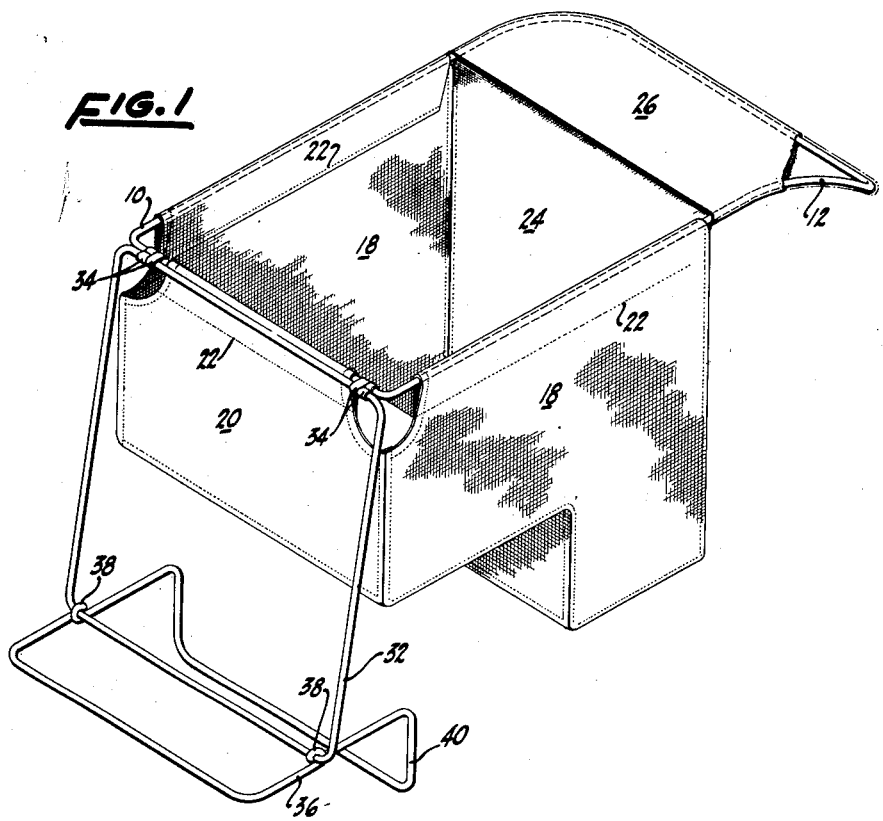
Figure 1 is a view in perspective of the auxiliary car seat embodying the invention.

Referring to the drawings, the car seat comprises a substantially rectangular rod-like frame 10 having its forward end 12 curved downwardly to adapt it substantially to the curvature of the top portion 14 of a front seat 16 of an automobile. An open topped carrier envelope, preferably of canvas or other sturdy fabric material, is suspended from the frame 10 by enfolding the upper edges of the side and rear panels thereof 18 and 20 over the side and rear portions of frame 10 and by securing these panel edges to the main bodies of the panels, as by stitching 22. The forward panel 24 of the carrier envelope is preferably provided with a sheath 26 integral therewith adapted to enclose the forward portion 12 of frame 10 and provide reinforcing support for panel 24. Light weight, rigid inserts, such as thin plywood boards, not shown, may be disposed within the seat and foot rest portions 28 and 30 of the carrier envelope to distribute the weight of the occupant fairly uniformly over the envelope and to maintain it in a hanging position, due to the weight of the inserts and the form that they impart to the bottom portions of the envelope, so that a child may be placed within the seat and removed therefrom with ease.

The frame 10 is provided with rearward support means comprising a substantially rectangular rod-like support frame 32 pivotally connected to frame 10, as by metal straps 34, and a foot frame 36 pivotally attached to frame 32, as by looped portions 38 of frame 36 sleeved on the lower end of frame 32. Foot frame 36 is provided with a flange portion 40 disposed at right angles with respect to the main body of the foot frame.

Figure 2:
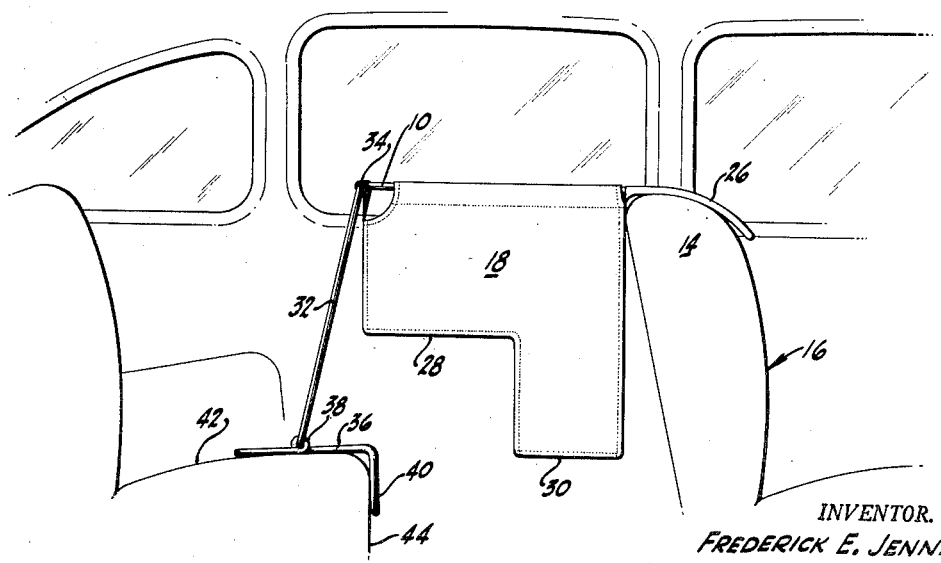
Figure 2 is a view in side elevation showing the car seat of the invention disposed in a position for use within a four-door car.
Figure 3:
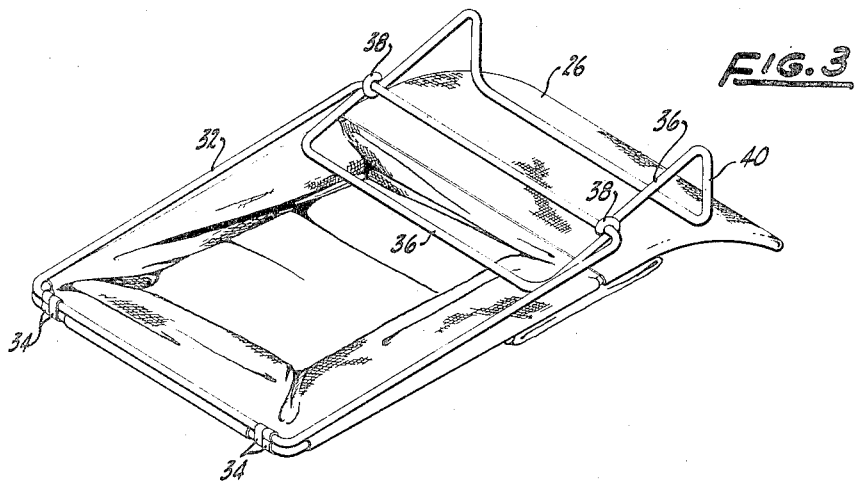
Figure 3 is a view in perspective of the car seat of the invention in folded condition.

Figure 2 shows the auxiliary car seat disposed in a position for use within a four-door car. The foot frame 36 engages the top of rear seat 42, with the flange portion 40 of the foot frame in engagement with the forward face 44 of the seat. The weight of the occupant of the auxiliary seat tends to maintain the flange portion 40 of the foot frame in engagement with the rear seat of the car, as shown.

The frictional engagement between the downwardly curved forward portion 12 of frame 10 and the top of the front seat of the car is sufficient, when the auxiliary seat is occupied, to prevent any rearward movement of the auxiliary seat with respect to the front seat. Motion of the auxiliary seat forwardly with respect to the front seat of the car is prevented by engagement of the forward panel 24 of the auxiliary seat with the back of the front seat, and by the further fact that the closed end sheath 26, embracing the forward portion 12 of frame 10, is integral with the panel 24, thus preventing sliding movement in a forward direction of frame 10 with respect to the carrier envelope.

Figure 4:
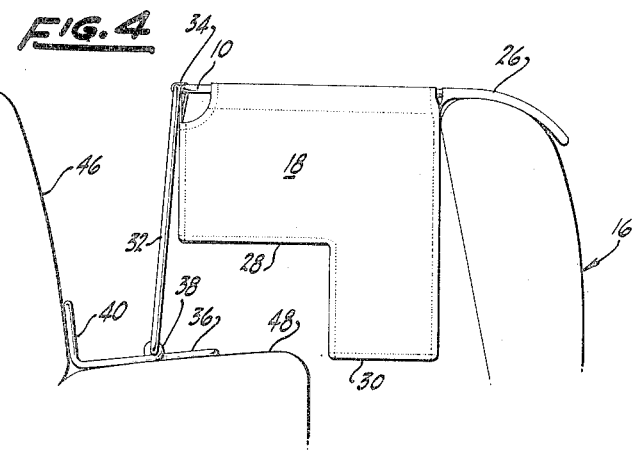
Figure 4 is a view in side elevation of the car seat showing the same operatively related to the front and back seats of a two-door car, i. e., a car having a club coupe type of spacing between the seats.

Figure 4 shows the auxiliary car seat disposed in position for use within a two-door car wherein the distance between the two main car seats is less than that for the car of Figure 2. Here, the foot frame 36 is inverted to dispose the flange portion 40 thereof in engagement with the face of the back rest 46 of the rear seat 48. The flange portion of the foot frame thus braces the frame 32 to maintain the main frame 10 in a substantially horizontal position.

It will be appreciated from the foregoing description that the occupant of the auxiliary car seat of the invention is positively maintained in a safe suspended position wherein he is substantially free from engagement with any rigid portion of the car and thus protected against transmitted jars due to impact of the car with another object, or a sudden starting or stopping of the car. It will further be appreciated that in the case of a collision, or the like, the occupant of the auxiliary seat is protected for the most part by the back of the upholstered front seat of the car.

While a specific embodiment of the invention has been shown and described, it is to be understood that all substantial equivalents thereof are within the spirit and scope of the invention.

What is claimed is:

1. An auxiliary car seat for children comprising a substantially rectangular first frame, means adapted to maintain said frame in a substantially horizontal position between the front and back seats of a car comprising a downwardly curved forward portion of said frame adapted to fit over the top of said front seat, a substantially rectangular second frame pivotally connected to the rearward end of said first frame, and a foot frame pivotally connected to said second frame, said foot frame being adapted to engage the seating surface of said rear seat and being provided with a right angle flange adapted to abut one of the substantially vertical surfaces of said rear seat, and a seat supported by said first frame and depending therefrom.

2. An auxiliary car seat, as set forth in claim 1, said seat comprising an open-top fabric envelope rectangular in plan form having hems at the upper ends of its side and rear portions in sleeved relation to the side and rear portions of said first frame, said envelope being provided with seat and foot rest bottom portions.

3. An auxiliary car seat, as set forth in claim 1, said seat comprising an open-top fabric envelope rectangular in plan form having hems at the upper ends of its side portions in sleeved relation to the side portions of said first frame and having integral with the upper edge of the forward portion thereof a rearwardly directed sheath enclosing the downwardly curved forward portion of said first frame.

References Cited in the file of this patent

UNITED STATES PATENTS

| Number | Name | Date |
|---|---|---|
| 1,167,453 | Warren | Jan. 11, 1916 |
| 1,383,324 | Martell | July 5, 1921 |

FOREIGN PATENTS

| Number | Country | Date |
|---|---|---|
| 128,513 | Australia | Aug. 12, 1948 |